United States Patent
Masat et al.

[11] 3,865,553
[45] Feb. 11, 1975

[54] APPARATUS FOR CONTINUOUSLY PREPARING PERCHLORMETHYL MERCAPTAN

[75] Inventors: Jan Masat; Rudolf Dohnalek; Jiri Chvejka, all of Prague, Czechoslovakia

[73] Assignee: Spolana, narodni podnik, Neratovice, Czechoslovakia

[22] Filed: Oct. 30, 1972

[21] Appl. No.: 302,118

Related U.S. Application Data

[62] Division of Ser. No. 196,948, Nov. 9, 1971, abandoned.

[30] Foreign Application Priority Data
Oct. 14, 1970  Czechoslovakia .................. 7699-70

[52] U.S. Cl. .................. 23/260, 23/283, 260/543 H
[51] Int. Cl. B01d 17/02, C01b 17/45, C07c 149/16
[58] Field of Search ...................... 23/260, 263, 283; 203/DIG. 6; 202/153, 163; 260/543 H

[56] References Cited
UNITED STATES PATENTS

| | | | |
|---|---|---|---|
| 2,011,704 | 8/1935 | Beekhuis, Jr. .................. | 23/260 |
| 2,232,674 | 2/1941 | Pyzel ............................... | 23/260 |
| 2,592,063 | 4/1952 | Persyn, Jr. ....................... | 23/260 |
| 2,648,594 | 8/1953 | Olson ............................... | 23/260 |
| 2,977,288 | 3/1961 | Cabbage .......................... | 23/260 |
| 3,544,625 | 12/1970 | Masat et al. ..................... | 260/543 H |
| 3,600,136 | 8/1971 | Giolito et al. .................... | 23/263 |

Primary Examiner—Joseph Scovronek
Assistant Examiner—Arnold Turk

[57] ABSTRACT

Apparatus for continuously preparing perchloromethyl mercaptan by chlorinating carbon disulphide by gaseous or liquid chlorine in a medium of aqueous solutions of inorganic acids containing hydrogen chloride, provides an upright reactor into which a liquid organic component and a liquid aqueously acidic component of the reaction mixture are introduced and from which the reaction mixture containing the arisen perchloromethyl mercaptan is withdrawn into a separation zone where it is separated to the aqueously acidic component and the organic component containing the arisen perchloromethyl mercaptan. After a minor portion of said components have been withdrawn from the reaction system, the remaining major portion of the aqueously acidic component is cooled, diluted by water and reintroduced back into the reaction zone while the remaining major portion of the organic component is, after being complemented with carbon disulphide, returned back into the reaction zone.

2 Claims, 2 Drawing Figures

APPARATUS FOR CONTINUOUSLY PREPARING PERCHLORMETHYL MERCAPTAN

This is the divisional application of application Ser. No. 196,948, filed Nov. 9, 1971, now abandoned.

BACKGROUND OF THE INVENTION

The present invention relates to the continuous preparation of perchloromethyl mercaptan, and more particularly by chlorination of carbon disulphide by gaseous or liquid chlorine in a medium of aqueous solutions of inorganic acids containing hydrogen chloride. Still more specifically, the present invention relates to an apparatus for continuously preparing perchloromethyl mercaptan.

It is already known that trichloromethyl sulphenyl chloride having the formula $Cl_3CSCl$ and called also perchloromethyl mercaptan is an important semi-product in processes of preparing organic fungicides, additives for lubricating oils and the like.

The hitherto known methods of the preparation thereof have been based either upon dry chlorination or, more recently, upon chlorination of carbon disulphide by gaseous or liquid chlorine in the presence of diluted hydrochloric acid.

Both said basic processes have been disclosed in many patents, such as, for instance, Czechoslovak Pat. Nos. 133,435 and 130,980, German Pat. Nos. 910,297, 915,335 and 1,229,518, U.S. Pat. Nos. 2,664,442, 2,666,081 and 3,544,625, British Pat. No. 1,108,484, Swiss Pat. No. 454,833, Italian Pat. No. 722,715 and French Pat. No. 1,437,938.

The more progressive method of preparing perchloromethyl mercaptan by chlorinating carbon disulphide by means of either gaseous or liquid chlorine at the presence of diluted hydrochloric acid solutions, as disclosed in the last-mentioned Patent Specification, is to be carried out in plants allowing an intense contact of the reactants in a constant volume ratio of 1 : 11. Specific yields attainable in practising the aforementioned processes, respective to the volume unit of the reaction room, may vary within the range of from 10 to 15 kg of perchloromethyl mercaptan per 100 lt./hr. of the reaction room. As process equipment there has usually been used a reaction kettle having an agitator and preferably communicating via recirculation loop with a condenser to which the reaction mixture is conveyed by a circulation pump.

Although the aforementioned methods, when compared with rather obsolete processes of dry chlorination of carbon disulphide, have brought about a certain progress to the art, they are yet connected with a disadvantage consisting, on the one hand, in a low specific yield, and, on the other hand, in rather expensive cooling methods.

The processes as well as the corresponding equipment to be used therefor, as hereinbefore referred to, request, namely, a relative steep temperature gradient to be established between the reaction mixture and a cooling medium, and such a flow velocity of this medium which would be capable of provoking a sufficient turbulence, which conditions require the reaction mixture to be cooled by a brine of which temperature has not to exceed 5° Centigrades below zero. Needless to say that such requirements lay excessive claims on cooling appliances and pumps.

The purpose of the present invention and the basic object of the same is to overcome the aforementioned disadvantages and to significantly improve the preparation of perchloromethyl mercaptan.

SUMMARY OF THE INVENTION

We have found out that by controlling the ratio of the reactants to one another and consequently by choosing the optimum reaction conditions as well as by employing a novel method of cooling, it is possible to achieve a higher yield and thus to render the preparation process more economical.

In accordance with one feature of our invention we provide an apparatus for continuously preparing perchloromethyl mercaptan by chlorinating carbon disulphide by gaseous or liquid chlorine in a medium of aqueous solutions of inorganic acids containing hydrogen chloride, which method comprises the introduction of the two liquid components of the reaction mixture, i.e. the organic layer containing perchloromethyl mercaptan, and the aqueously acidic layer containing both hydrochloric acid and sulphiric acid, in a ratio of from 1 : 3 to 1 : 7 together with chlorine into a chlorination zone enabling an intimate contact of the reaction components, and therefrom into a separation zone where they are separated to an aqueously acidic layer and an organic one. The former is cooled, diluted by water and reintroduced into the reaction zone. The latter, after carbon disulphide has been added thereto, is returned also into the reaction zone. A minor portion of the two layers is withdrawn from the reaction system.

For carrying out the above method we propose a suitable apparatus comprising a vertical reactor provided with at least one perforated partition. With one of its end portions, the reactor communicates with a separator. The top portion of the separator is joined via a cooler to a pump whilst its bottom portion communicates with another pump. The two pumps are connected via delivery pipeline to the opposite end portion of the reactor. The circuit is in one or more regions provided with an inlet or inlets for supplying raw materials, i.e. carbon disulphide, chlorine and water. Moreover, each of the two circuits is equipped with an outlet for withdrawing a portion of both circulated layers, the aqueous layer and the organic layer. The porosity grade of perforated partitions varies within the limits between 2 and 40% of the overall reactor cross-section. The axes of the apertures in the partitions may be oriented either in parallel with the reactor axis, or, in order to enhance the effect of intermixing the reactants, disposed in such a way that an imaginary plane comprehending the axes of a row of apertures includes with the plane of the axes aparture row an angle of from 0° to 140°. Apart from this, the apparatus according to the invention can be provided with automatic control means to maintain continuous operation under optimum conditions.

In operation, due to the action of the perforated partitions, the chlorination of carbon disulphide takes place in the reactor under an intense agitation and an intimate contact of the reactants. From one of the reactor end portions, the reaction mixture is withdrawn into the separator where it is separated to a lighter, aqueously acidic phase containing both hydrochloric and sulphuric acid, and a heavier organic phase containing perchloromethyl mercaptan and a non-reacted carbon disulphide portion. The upper layer is led by a circulation pump into a cooler and therefrom, after having been diluted with water, to the opposite end portion of the reactor. To the same reactor end portion there is led via circulation pump also the lower organic layer after adding carbon disulphide thereto.

An essential advantage of the apparatus according to the present invention lies in the possibility of controlling the ratio of the reactants to one another and consequently of choosing the optimum reaction conditions. Another advantage of the newly proposed method and apparatus resides in a more economical cooling method. Since only the aqueously acidic layer is to be cooled, its amount passing through the cooler is sufficient for removing the reaction heat even by a low temperature gradient, which is given by the usual cooling water temperature of from 20° to 25° C.

The apparatus according to the invention, however, possesses a lot of other merits. Thus the perforated partitions provided in the reactor ensure an intimate contact between the reactants, due to an intense intermixing thereof. In this way a fair chlorination process and a high specific yield may be safeguarded, the latter reaching from 25 to 35 kg./hr. of perchloromethyl mercaptan per 100 lt, of the reaction room, in contrast to 10 – 15 kg./hr. thereof attainable in practising prior method. Except the pumps, the apparatus does not comprise any moving elements which, with considerably corroding reaction medium in view, would require both material and design solutions and which may constitute source of numerous failures and troubles in operation. Apart from this, the method and apparatus according to the invention bring about considerable power and capital savings.

The following example is given as illustrative only, without, however, limiting the invention to the specific details thereof.

EXAMPLE

Into a vertical reactor of 15 cm. diameter and 3 m height, equipped with nine perforated partitions having 10 per cent of their total area apertured, further with a separator together with recirculation loops for both aqueously acidic and organic layers, and filled up with the reaction mixture coming from a preceding expermient, there were dosed within a period of 225 minutes and at a temperature of from 35 and 40° Centigrades, 30 kg. of carbon disulphide, 185 lt. of water and 11 cu.m./hr of chlorine, both organic and aqueously acidic phase having been withdrawn during the reaction. From the organic phase 73.5 kg. of 100 per cent perchloromethyl mercaptan were obtained, which amount corresponded to 73.8 percent theoretical yield respective to carbon disulphide dosed, and to the specific yield of 28.8 kg./hr. or perchloromethyl mercaptan per 100 lt. of the reaction capacity.

The novel features which are considered as characteristic for the invention are set forth in particular in the appended claims. The invention itself, however, as to its construction together with additional objects and advantages thereof will be best understood from the following description of a specific embodiment when read in connection with the accompanying drawing.

DESCRIPTION OF THE PREFERRED EMBODIMENT

Figure 1:
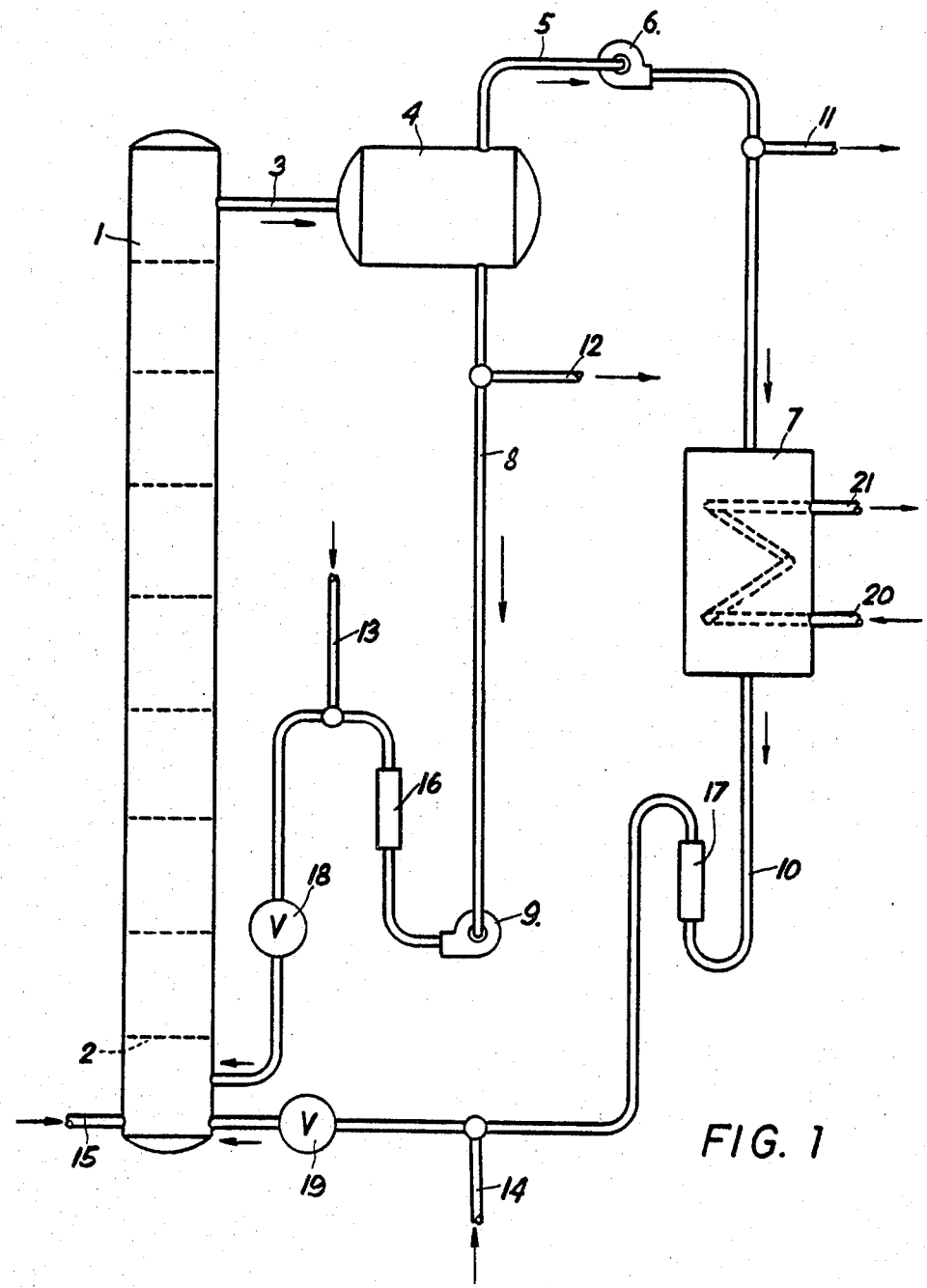
FIG. 1 is a somewhat schematic vertical sectional view of an apparatus for the preparation of perchloromethyl mercaptan by chlorinating carbon disulphide.

Discussing FIG. 1 of the drawing in detail, it will be seen that reference numeral 1 identifies a substantially vertical reactor equipped with perforated partitions 2 and a chlorine supply inlet 15. The reactor 1 is adapted to communicate via a mouth 3 with a separator 4. From the bottom part of the separator 4 there extends a pipeline 8 leading via a pump 9 to the bottom part of the reactor. From the suction side of the pipeline 8 an outlet 12 for withdrawing the reaction product is branched off. The discharge side of said pipeline 8 is provided with a rotameter 16, a carbon disulphide supply inlet 13 and a valve 18. From the top part of the separator 4 there extends a pipeline 5 passing via a pump 6 through a cooler 7 which latter is provided with an inlet 20 and an outlet 21 for supplying and removing a cooling medium respectively. The pipeline 5 enters also the bottom part of the reactor 1 and is provided with an outlet 11 for withdrawing the aqueously acidic component of the reaction mixture, further with a rotameter 17, water supply 14 and a valve 19.

Figure 2:
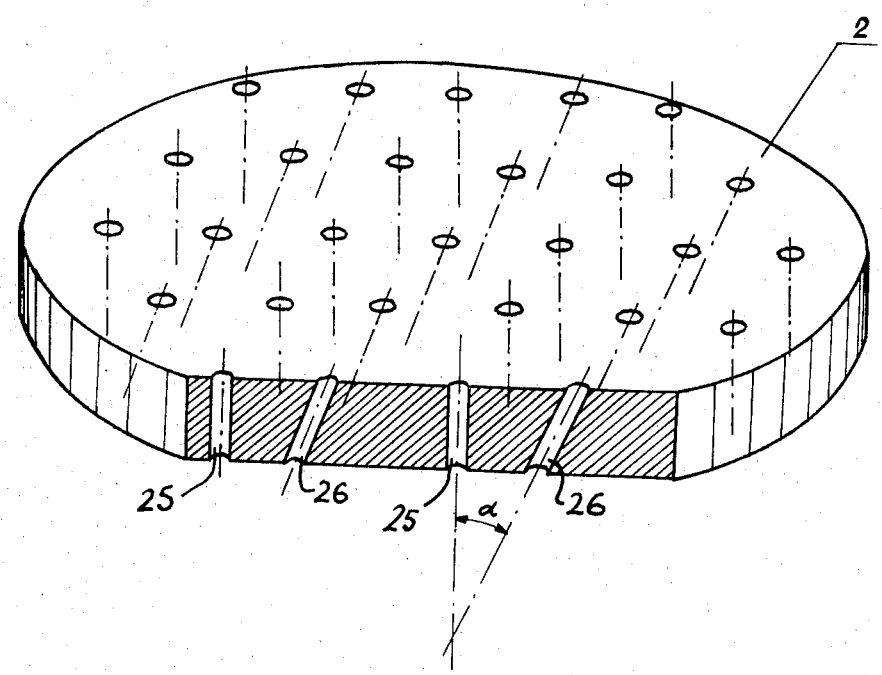
FIG. 2 is a view in perspective of a perforated partition, a portion of the partition being broken away for clarity of illustration.

A perforated partition 2 in accordance with the invention is shown in detail in FIG. 2. As there shown, an edge portion of the partition has been broken away along a plane containing the axes of four apertures disposed in a row. Apertures 25, which are spaced from each other, are disposed with their axes parallel and normal to the broad extent of the partition plate 2. Apertures 26, which alternate with apertures 25, are disposed at an angle $\alpha$ with respect to the axes 25 disposed in such sectioning plane. As disclosed above, the angle $\alpha$ may vary from 0°–140°.

Porosity grade, which is the total of all areas of apertures together, can be expressed in percent of overall cross-section of the partition. For example, if the diameter of one aperture is 2 mm and the perforated partition has a diameter of 200 mm and there are 1,000 apertures, the porosity grade of the perforated partition is 10%.

While the invention has been illustrated and described as embodied in apparatus for continuously preparing perchloromethyl mercaptan, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art clearly constitute essential characteristics of the generic and specific aspects of this invention and therefore, such adaptations should and are intended to be comprehended within the meaning and range of equivalence of the following claims.

What is claimed as new and desired to be protected by Letters Patent is set forth in the appended claims:

1. An apparatus for continuously preparing perchloromethyl mercaptan, comprising in combination, a. a reactor having a top and a bottom end portion and provided with a chlorine supply inlet and with at least one perforated partition for mixing the components of the reaction mixture, the apertures through the partition having a total area varying between 2 and 40 percent of the overall cross-section of the reactor;

b. a cooler provided with an inlet and an outlet for supplying and withdrawing a cooling medium, respectively;

c. inlet means for introducing carbon disulphide and water; and d. a separator for separating the aqueous and organic layers, said separator having a top and a bottom end portion as well as an inlet, the separator being directly connected via the inlet means to the top of the reactor, pipelines extending from the top and bottom of the separator, both pipelines having a pump, the pipeline from the top being divided into a product outlet line and a discharge line which passes through the cooler to the reactor bottom, and the pipeline from the separator bottom being divided into a product outlet line and a discharge line which leads to the reactor bottom, the water supply inlet discharging into the pipeline of the inorganic layer, and the carbon disulphide supply inlet discharging into the pipeline of the organic layer.

2. An apparatus as defined in claim 1, wherein the axes of said apertures of two adjacent rows include an angle of from 0° to 140°.

* * * * *